Feb. 4, 1936.  E. G. KESLING  2,029,485
GEAR SHIFTING MECHANISM
Filed Oct. 18, 1933  3 Sheets-Sheet 1
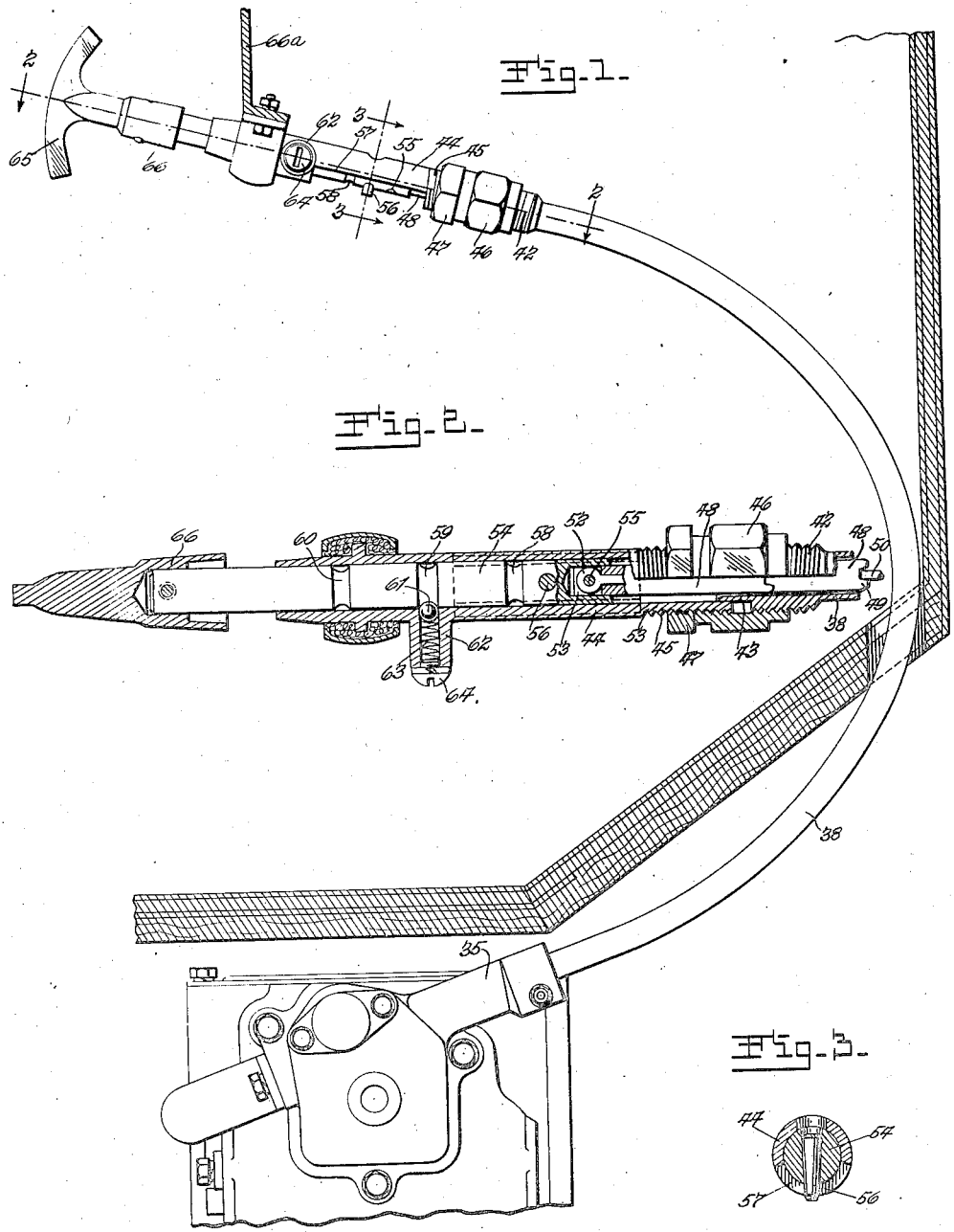
Inventor
Elmer G. Kesling
by Rippey & Kingsland
His Attorneys.

Feb. 4, 1936.  E. G. KESLING  2,029,485
GEAR SHIFTING MECHANISM
Filed Oct. 18, 1933  3 Sheets-Sheet 2
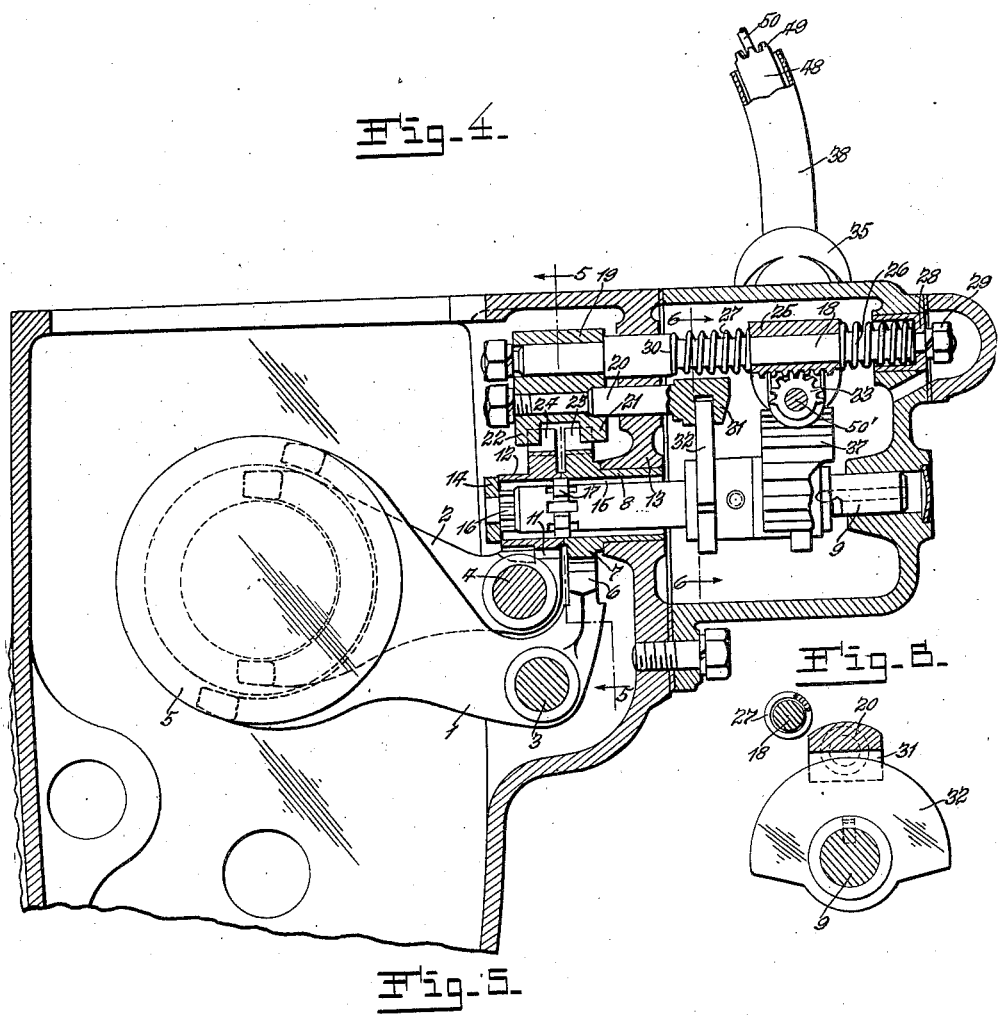
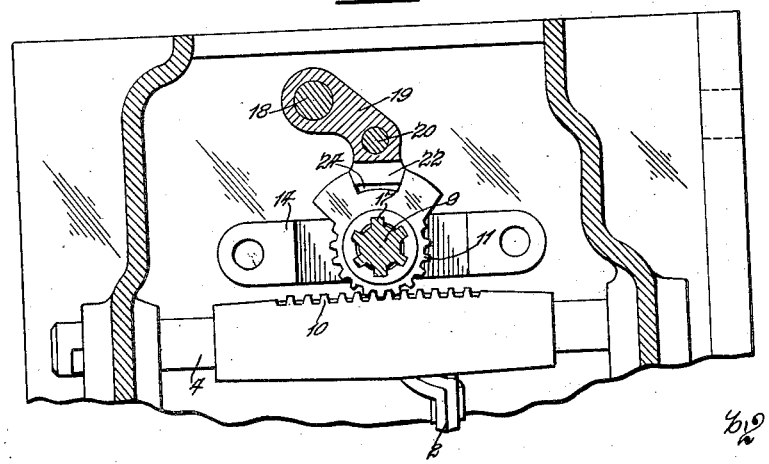
Inventor
Elmer G. Kesling
by Rippey & Kingsland
His Attorneys Feb. 4, 1936.  E. G. KESLING  2,029,485
GEAR SHIFTING MECHANISM
Filed Oct. 18, 1933  3 Sheets-Sheet 3
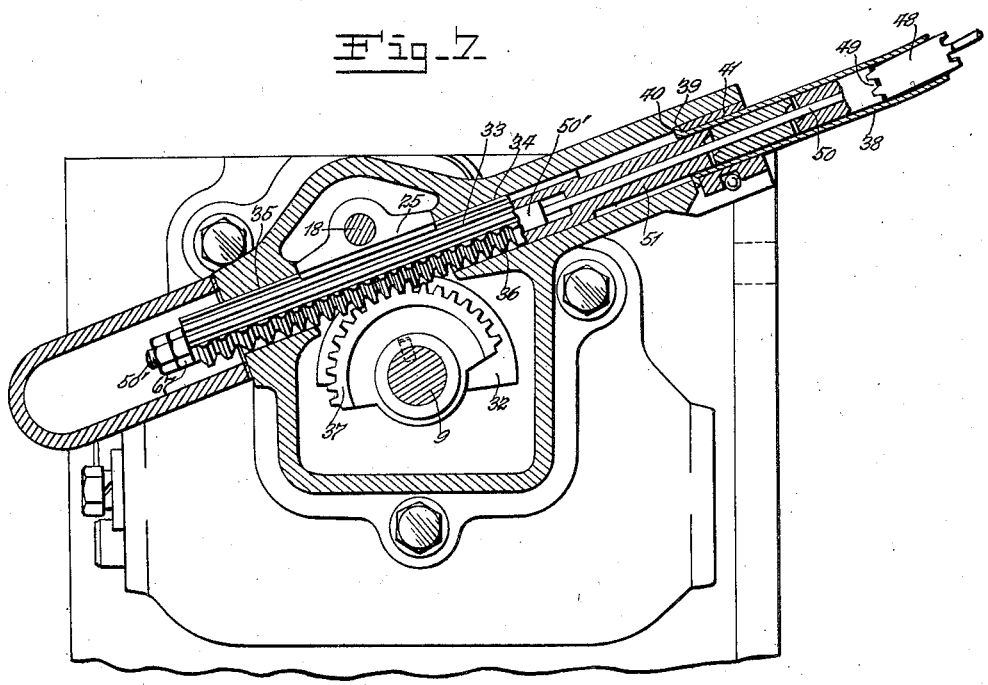
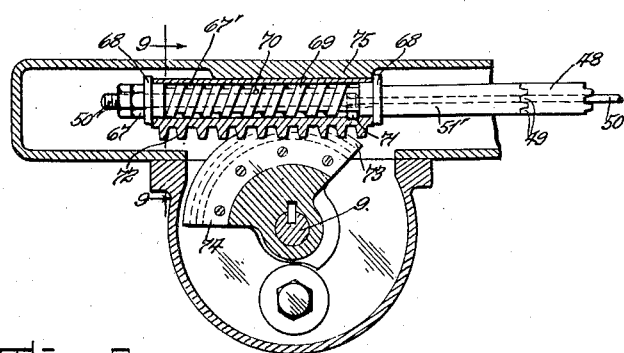
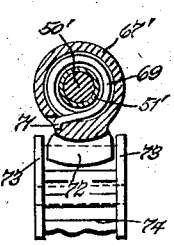
Inventor
Elmer G. Kesling
by Rippey & Kingsland
His Attorneys Patented Feb. 4, 1936

2,029,485

UNITED STATES PATENT OFFICE 2,029,485

GEAR SHIFTING MECHANISM

Elmer G. Kesling, Bloomfield, Mo.

Application October 18, 1933, Serial No. 694,046

19 Claims. (Cl. 74—473)

This invention comprises improvements in gear shifting mechanism, and has special reference to gear shifting mechanism of the general type disclosed in my copending application, Serial No. 683,977, filed August 7, 1933.

An object of the invention is to provide means for endwise adjustment of the working clearance of the elements of a jointed shaft, such adjustment being easily and readily made in assembly and after the joints may have become worn from use.

Another object is to provide limiting means for the selective movements and resilient means in the train of the selective mechanism whereby the translated selective forces will be limited, and thereby allowing the use of relative weak transmission means between said limiting means and resilient means.

Other objects of the invention are to provide improved means for operating the shifter devices of the gear shifting mechanism selectively and positively and, at the same time, positively preventing displacement or effective movement of the unoperative parts of the mechanism; to improve the operative connections for effecting and controlling the operation of the gear shifting mechanism; and to provide all of the improved features of construction and arrangement of parts herein disclosed, reference being made to the annexed drawings, in which—

Fig. 1 is a side elevation of my improved gear shifting mechanism.

Fig. 2 is an enlarged longitudinal sectional view on the line 2—2 of Fig. 1.

Fig. 3 is a cross sectional view on the line 3—3 of Fig. 1.

Fig. 4 is a vertical transverse sectional view of the gear case and a part of the shifting mechanism.

Fig. 5 is a sectional view on the line 5—5 of Fig. 4.

Fig. 6 is a sectional view on the line 6—6 of Fig. 4.

Fig. 7 is a vertical longitudinal sectional view at right angles to the section of Fig. 4.

Fig. 8 is a view showing an alternative form of connection between the operating shaft and the gear device operated thereby, said connection including a spring.

Fig. 9 is a sectional view on the line 9—9 of Fig. 8 showing a connection whereby one end of the spring is attached to the gear device.

The shifter forks 1 and 2 are supported by spindles 3 and 4 for lateral shifting movements. The fork 1 is operatively engaged with a gear hub 5 and the fork 2 is operatively engaged with a laterally shiftable device (not shown) for intermediate and high speed.

A rack 6 (Fig. 4) in connection with the fork 1 permanently engages a segmental rack 7 rigid with a hub 8 mounted on a spindle 9 supported for longitudinal and turning movements; while the fork 2 is rigid with a rack 10 in permanent mesh with a segmental rack 11 rigid with a hub 12 which is also supported by the spindle 9 at one end of the hub 8. The hub 8 is mounted in a bearing 13, permitting turning movements of said hub and preventing longitudinal movements in one direction. One end of the hub 12 engages the end of the hub 8 opposite from the bearing 13 and the opposite end of said hub 12 is engaged by a strap 14. Thus, the hubs 8 and 12 are held from longitudinal movements in either direction but are capable of free turning movements.

A number of longitudinal grooves 15 are formed in the hub 8 and a similar number of similar longitudinal grooves 16 are formed on the inside of the hub 12, and these grooves 15 and 16 receive radial ribs or flanges 17 rigid with the spindle 9. In the intermediate or unselected position of the spindle 9 the ribs 17, which constitute key elements, are engaged in both the grooves 15 and 16, but said spindle 9 is movable longitudinally in either direction from said intermediate or unselected position to disengage the key elements 17 from the grooves 15 and selectively engage them wholly in the grooves 16, or to disengage said key elements wholly from the grooves 16 and selectively engage them only in the grooves 15. Thus, the spindle 9 may be moved longitudinally to obtain effective selective operative engagement with either of the hubs 8 or 12, as desired.

A rod 18 is supported by the gear housing for longitudinal movements. An arm 19 is mounted on the rod 18 and on a cooperating rod 20, which is also supported by the gear housing for longitudinal movements with the rod 18. The arm 19 is formed with rigid fingers 21 and 22 movable into and out of notches 23 and 24 in adjacent portions of the hubs 8 and 12, respectively. In any intermediate position of the rod 18, the fingers 21 and 22 are engaged in the notches 23 and 24, respectively. Said rod 18 is movable longitudinally to one extreme or selective position to disengage the finger 21 from the notch 23 and thereby permit the rack 7 to be turned while the rack 11 is positively held from turning by the finger 22 engaging in the notch 24; and the rod 18 is movable longitudinally in the other extreme position to disengage the finger 22 from the notch 24 and thereby permit the rack 11 to be turned while the rack 7 is positively held from running by the finger 21 engaged in the notch 23. Thus, the parts 21, 22, 23 and 24 constitute a selectively controlled interlocking means.

A rack 25 is mounted loosely on the rod 18 between springs 26 and 27. The outer end of the spring 26 abuts against a bushing 28 supported by the gear housing for sliding movements and held from outward movement by a nut and washer device 29 mounted on the outer end of said rod 18. The end of the spring 27 that is opposite from the rack member 25 abuts against a shoulder 30 on the rod 18. When the notches 23 and 24 are in alinement, the rod 18 is freely movable longitudinally to and from either direction by the rack 25 acting in cooperation with the springs 26 and 27, respectively, said rod 18 being moved either by the spring 26 or by the spring 27 when said rack 25 is operated in opposition thereto selectively; however, if the notches 23 and 24 have been turned out of alinement after the rod 18 has been selectively moved to one extreme longitudinal position, said rod 18 is positively locked against longitudinal movement, but the rack 25 may be moved along said rod 18 against the resilient action of the corresponding spring 26 or 27.

The outer end of the rod 20 is formed with a jaw 31 engaging a segmental arm 32 attached to the spindle 9. Thus, the spindle 9 is moved longitudinally by and with the rod 18.

An elongated rack 33 is mounted for longitudinal and rocking movements in bearings 34 and 35 and is in constant mesh with the rack 25. Thus, turning movements of the rack 33 will move the rack 25 and thereby the rod 18 longitudinally, but the rack 33 may be moved longitudinally without moving the rack 25. A series of teeth 36 are rigid with the rack 33 and are in permanent mesh with an arcuate rack 37 attached to the spindle 9, so that longitudinal movements of the rack member 33—36 will turn the spindle 9 without moving the rack 25 and turning movements of the member 33—36 will move the rack 25 and thereby the rod 18, by means of the springs 26 and 27, without moving the rack 37.

A curved tube 38 has its lower end provided with an outwardly extended flange 39 (Fig. 7) abutting against a shoulder 40 at the outer end of the bearing 34 and clampingly engaged by a sleeve 41 mounted in the outer end of said bearing 34. The upper end of the tube 38 is formed with threads 42 (Fig. 1) and has a portion 43 beyond said threads telescoping within the lower end of a sleeve 44 which is formed with threads 45 running in the opposite direction from the threads 42. A nut 46, having oppositely disposed threads in its ends, is screwed on the threads 42 and 45 and thereby attaches the tube 38 to the sleeve 44. A lock nut 47 screwed on the threads 45 is clamped against the end of the nut 46 and prevents said nut 46 from working loose.

A series of shaft sections 48, having their ends provided with interlocking teeth 49, are mounted for longitudinal and turning movements in the tube 38. A rod 50 extends axially through all of the sections 48 and extends into an elongated part 51 of the member 33—36 and has its lower end attached to a shaft portion 50' by welding or otherwise. The upper end of the rod 50 is formed with an eyelet 52 located within a recess 53 in the upper end of the upper rod section 48. The rod 50 ties all of the rod sections 48 together and in connection with an operating rod section 54. A pin 55, extending through the eyelet 52, attaches together the adjacent ends of the parts 48, 50 and 54. A pin 56, mounted in the rod 54, projects through an elongated slot 57 in the sleeve 44 and by engagement with the side walls of the slot 57 limits extent of turning movement of the rod 54 in either direction. The rod 54 is formed with circumferential grooves 58, 59 and 60 adapted to be engaged by a detent element 61 mounted in an opening in a lateral projection 62 of the sleeve 44 and actuated by a spring 63. The detent 61 engages the groove 58 when all parts are positioned for intermediate and reverse speeds, and engages the groove 59 when all parts are in neutral position, and engages the groove 60 when all parts are positioned for low and high speeds. The outer end of the spring 63 is engaged by the inner end of a screw 64 screwed into the outer end of the projection 62.

A handle 65 has a socket 66 receiving the outer end of the rod 54 and is operative to turn said rod 54 or to move said rod longitudinally, as desired. The shaft portion 50' is mounted in the member 33—36 and extends beyond the lower end thereof. The shaft portion 50' and the member 33—36 are capable of relative longitudinal adjustment. A nut 67, screwed on the lower threaded end of the shaft portion 50', engages the lower end of the member 33—36 and is effective to secure all of the shaft sections 48, the member 33—36—51 and the rod 54 together in cooperative relationship for operation by the handle 65. The nut 67 constitutes means for adjusting endwise working clearance of the sectional shaft operated by the handle 65.

Because of the connection described, turning movements of the rod 54 by the handle 65 will move the rod 18 longitudinally in one direction or the other by the action of the springs 26 and 27; and longitudinal movements of the rod 54, after said rod has been turned as far as possible in either direction, will turn the spindle 9 and thereby operate either the rack 7 or the rack 11 and shift the fork 1 or the fork 2 as the case may be.

In the embodiment shown, this gear shifting mechanism may be conveniently mounted at the front of an automobile body and for the most part in front of the supporting member or instrument board 66a, leaving the floor of the vehicle unobstructed.

In operation, when the parts are in neutral position it is necessary first to turn the handle 65 and thereby move the rod 18 longitudinally to release or unlock the rack 7 or the rack 11 before the handle 65 can be moved longitudinally to turn the spindle 9. This is because the spindle 9 cannot be turned while the key elements 17 are engaged by both series of grooves 15 and 16, it being necessary to disengage said key elements 17 from one or the other of said series of grooves, and also necessary to release one or the other of the fingers 21 or 22 from the notches 23 or 24 before the spindle 9 can be turned. After the proper longitudinal shifting of the rod 18 and the consequent release of either the finger 21 or the finger 22 from the notch 23 or the notch 24, as the case may be, and the simultaneous release of the key elements 17 either from the hub 8 or the hub 12, the handle 65 may be moved longitudinally to turn the spindle 9 and thereby shift the fork 1 or the fork 2.

The sectional shaft is limited in rotation by the pin 56 engaging a wall of the slot 57. Therefore, the amount of force exerted by the sections 48 will never exceed the force required to compress the corresponding spring 26 or 27, as the case may be, and any force in excess of this amount applied to the handle 65 will be borne by the operating rod 54 and the pin 56 against a wall of the slot 57.

From the foregoing, it is apparent that the spindle 9 is supported for longitudinal movements from an unselected position and subsequent turning movements. When the spindle 9 is in its unselected position, both gearings 7 and 11 are engaged by the parts 17, and the respective gearings are engaged by the parts 21 and 22, thus providing means connecting the spindle 9 and the gearings for locking said gearings and thereby locking said spindle 9 against turning while the spindle remains in its unselected position.

In the construction shown in Figs. 8 and 9, a sleeve 67' is mounted between abutments 68 mounted on the lower end of the operating shaft comprising the parts 48 and 50 and their associated features. The abutments 68 allow the part 51' to turn relative to the sleeve 67' but prevent relative longitudinal movements between said part 51' and said sleeve 67'. A spring 69 confined within the sleeve 67' has its intermediate portion secured to the operating shaft by an attachment 70 and its ends 71 attached to the sleeve 67', thus providing a resilient rotative connection between said sleeve and the actuating shaft therefor. A series of teeth 72, which constitute both selecting and shifting devices, extend between plates 73 and mesh with a segmental rack 74 attached to said plates and attached to the spindle 9. Thus turning of the sleeve 67' will shift the spindle 9 longitudinally, and longitudinal movement of the sleeve 67' will turn the spindle 9. The sleeve 67' is guided and held in permanent mesh with the rack 74 by a guide bearing 75. It should be understood that the upper end of this operating shaft is provided with the same equipment as that shown in Figs. 1 and 2 and heretofore described.

It is apparent that my invention obtains all of its intended objects and purposes efficiently, economically and satisfactorily and may be easily operated. The mechanism is free from features of complication and may easily be assembled, and disassembled and reassembled for replacement of the parts or other purposes. I do not restrict myself unessentially but what I claim is:—

I claim:

1. Gear shifting mechanism of the character described comprising a number of relatively shiftable elements, a spindle supported for longitudinal movements from unselected position and subsequent turning movements, resilient means for shifting said spindle longitudinally, cooperative locking elements controlled by said spindle and said resilient means respectively for locking said spindle against turning while said spindle remains in said unselected position, means for turning said spindle after longitudinal movement thereof, and mechanisms operative by said spindle for shifting said elements by said turning movements of said spindle after said spindle has been moved longitudinally from said unselected position.

2. Gear shifting mechanism of the character described comprising a number of relatively shiftable elements, a spindle supported for longitudinal movements from unselected position and subsequent turning movements, resilient means for shifting said spindle longitudinally, cooperative locking elements controlled by said spindle and said resilient means respectively to lock said spindle against turning while said spindle remains in said unselected position, devices for operating said resilient means to move said spindle longitudinally and for turning said spindle after longitudinal movement thereof respectively, and mechanisms operative by said spindle for shifting said elements by said turning movements of said spindle after said spindle has been moved longitudinally from said unselected position.

3. Gear shifting mechanism of the character described comprising two relatively shiftable elements, a spindle supported for longitudinal movements to selected position from unselected position and for turning movements while in selected positions, resilient means for moving said spindle longitudinally from and to said selected and unselected positions, means for turning said spindle after longitudinal movement thereof to said selected position by said resilient means, mechanism operated by said spindle for shifting one of said elements by said turning movement of said spindle after said spindle has been moved longitudinally by said resilient means to said selected position from said unselected position, and cooperative locking elements controlled by said spindle and said resilient means respectively for locking said spindle against turning while said spindle remains in said unselected position.

4. Gear shifting mechanism of the character described comprising two relatively shiftable elements, a spindle supported for longitudinal movements to selected position from unselected position and for turning movements while in selected positions, resilient means for moving said spindle longitudinally from and to said selected and unselected positions, means for turning said spindle after longitudinal movement thereof to said selected position by said resilient means, mechanism operated by said spindle for shifting one of said elements by said turning movement of said spindle after said spindle has been moved longitudinally by said resilient means to said selected position from said unselected position, and cooperative locking elements controlled by said spindle and said resilient means respectively for locking said spindle against turning while said spindle remains in said unselected position and for locking the other one of said pair of shiftable elements against movement while said first named one of said elements is being shifted by turning movement of said spindle.

5. Mechanism of the character described comprising two selectively shiftable elements, devices for shifting said elements selectively, a spindle supported for longitudinal movements to select either of said devices and for subsequent turning movements to operate said selected device while the other device remains unselected, resilient means for moving said spindle longitudinally as aforesaid, and cooperative locking elements controlled by said spindle and said resilient means respectively for locking the unselected device after said resilient means is operated to move said spindle to position to operate the selected device.

6. Gear shifting mechanism of the character described comprising a spindle supported for longitudinal and turning movements, gear mechanism for turning said spindle, a tube, a sectional shaft mounted in said tube for longitudinal and turning movements, a resilient connection between said shaft and a part of said gear mechanism, and manual means for imparting longitudinal and turning movements to said shaft.

7. Gear shifting mechanism of the character described comprising a spindle supported for turning and longitudinal movements, gear mechanism for turning and moving said spindle longitudinally, a tube, a sectional shaft supported and guided in said tube for operating said gear mechanism, and a resilient connection between said shaft and a part of said gear mechanism for moving said spindle longitudinally by turning movement of said shaft.

8. In gear mechanism having elements to be shifted, a jointed shaft for shifting said elements comprising end members, endwise interlocked shaft sections mounted between and operatively connected with said members, a tie rod extending through said sections and having its ends attached to said end members, means adjustably connected with one end of said tie rod for holding the same in cooperative relation with respect to said sections, and resilient means connecting one of said end members of said jointed shaft with said elements to be shifted.

9. Gear shifting mechanism comprising elements to be shifted, an operating shaft supported for longitudinal and turning movements, means for limiting extent of turning movements of said shaft, a spindle mounted for longitudinal and turning movements, a jointed shaft operative by said first shaft, and resilient means operatively connecting said jointed shaft and said spindle and limiting the force exerted upon said spindle by said jointed shaft.

10. In gear shifting mechanism having elements to be shifted, an operating device supported for longitudinal and turning movements, means for limiting extent of turning movements of said operating device, a spindle supported for longitudinal and turning movements, a jointed shaft operatively connected with said operating device for operation thereby, resilient means operatively connecting said jointed shaft with said spindle and limiting the extent of force applied to said spindle by said jointed shaft, and means for preventing longitudinal movements of said operating device in certain positions thereof until said operating device has been turned.

11. Gear shifting mechanism comprising elements to be shifted, an operating device supported for longitudinal and turning movements, means at one end of said operating device for imparting longitudinal and turning movements thereto, means for limiting extent of turning movements of said operating device, and resilient means interposed between the opposite end of said operating device and said elements to be shifted for shifting said elements by said operating device.

12. Gear shifting mechanism comprising elements to be shifted, an operating device supported for longitudinal and turning movements, means at one end of said operating device for imparting longitudinal and turning movements thereto, means for limiting extent of turning movements of said operating device, resilient means interposed between the opposite end of said operating device and said elements to be shifted for shifting said elements by said operating device, and means for preventing longitudinal movements of said operating device in certain positions thereof until said operating device has been turned.

13. Gear shifting mechanism comprising elements to be shifted, members having endwise interlocking engagement and forming a shaft, resilient means connecting one end of said shaft with said elements to be shifted for shifting said elements by said shaft, means connected with one end of said shaft for adjusting and holding said members in cooperative relation with respect to each other and with respect to said resilient means, and means for limiting extent of turning movements of said shaft.

14. Gear shifting mechanism of the character described comprising gear shifter elements, a spindle supported for longitudinal selective movements and rotative shifting movements, devices operative by said spindle to move said gear shifter elements respectively, resilient means supported for moving said spindle to selective positions, and mechanism for actuating said resilient means and also for imparting rotative movements to said spindle.

15. Gear shifting mechanism comprising shifter elements, a spindle supported for selective longitudinal movements and subsequent rotative movements to shift the element selected, locking means for preventing shifting movements of said mechanism until after a selection has been effected, resilient means supported for coincidentally selectively moving said spindle longitudinally and controlling said locking means, and devices for operating said resilient means and also for subsequently turning said spindle to shift the element selected.

16. Gear shifting mechanism comprising shifter elements, devices for selectively shifting said elements, an operating shaft supported for turning and longitudinal movements, limiting means for limiting extent of turning movements of said shaft, a second shaft comparatively weak but decidedly positive in transmitting turning forces connected to said operating shaft for like movements thereby, resilient means operatively connecting said second shaft and said devices to selectively position said devices, means operatively connecting said second shaft and said devices to shift the element selected, and manual means for moving said operating shaft, whereupon said limiting means and said resilient means cooperate to prevent application of undue rotative force to said second shaft.

17. Gear shifting mechanism of the character described comprising a spindle supported for longitudinal and turning movements, gear mechanism for turning said spindle, resilient means for moving said spindle longitudinally, a tube, and a sectional shaft mounted in said tube for turning and longitudinal movements for operating said resilient means and also said gear mechanism to move said spindle longitudinally and also to rotate said spindle.

18. Mechanism of the character described comprising a spindle mounted for longitudinal selective movements and rotative shifting movements, an operating means, means including a resilient element connecting said spindle with said operating means for imparting selective movements to said spindle, and other means connecting said spindle with said operating means for imparting shifting movements to said spindle.

19. Mechanism of the character described comprising selective shifter elements, an actuator engageable to shift said shifter elements, means including a resilient member for engaging said actuator with said shifter elements, other means for moving the engaged actuator, and an operating device for operating said means and said other means respectively.

ELMER G. KESLING.